though it may have an excellent filter-   described drawbacks completely and consequently the
production has been carried out, neglecting the decrease
of volume due to the shrinkage and the occurrence of the
partial deformation.

United States Patent Office 3,663,470
Patented May 16, 1972

3,663,470
METHOD OF PRODUCING POLYVINYL ACETAL POROUS ARTICLES AND THE SHAPED POROUS ARTICLES MADE THEREFROM
Hiroshi Nishimura, Sowa-machi, and Shizuo Sato, Tokyo, Japan, assignors to Kanegafuchi Boseki Kabushiki Kaisha, Tokyo, Japan
No Drawing. Filed May 28, 1970, Ser. No. 41,631
Claims priority, application Japan, June 5, 1969, 44/44,387
Int. Cl. C08f 27/20, 47/08
U.S. Cl. 260—2.5 F                                    12 Claims

ABSTRACT OF THE DISCLOSURE

Polyvinyl acetal porous articles having useful and excellent properties as cosmetic sponge puff, sponge handkerchief, filtering media and the like are produced by reacting an aqueous solution of polyvinyl alcohol with an aldehyde and an acid catalyst in the presence of at least one water soluble inorganic salt, with or without a pore forming agent.

---

The present invention relates to a method of producing polyvinyl acetal porous articles and products made therefrom.

An object of the present invention is to provide a novel method of producing improved polyvinyl acetal porous articles.

Another object of the present invention is to provide a novel method of producing commercially conveniently polyvinyl acetal porous articles having useful and excelent properties as a cosmetic sponge puff, sponge handkerchief, filtering media and the like.

As the previous methods of producing polyvinyl acetal porous articles many processes have been known. In one embodiment of them, the acetalization which is caused by reaction of an aqueous solution of polyvinyl alcohol with an aldehyde in the presence of an acid catalyst, is performed in the presence of an aqueous solution of a paste of starch, dextrine or derivatives thereof. In another embodiment of them, the acetalization is performed in the presence of a surface active agent having acid resistance.

However, the heretofore known methods are slow in the acetalization reaction and further the coagulated product having a low acetalization degree, which is formed at the original stage of the acetalization reaction, is separated from an inner wall of a reaction vessel (often referred to as mold hereinafter) during the coarse of the reaction and a fair degree of shrinkage or deformation occurs until the completion of the reaction. Consequently, the volume of the resulting polyvinyl acetal porous articles decreases considerably as compared with the original volume of the reaction solution and the apparent specific gravity increases and consequently the pressure loss in filtration of fluid is higher than the case wherein the shrinkage does not occur and the uniformity of the micropores and the surface smoothness are inferior to such a case.

Particularly, in commercial production, the amount to be produced is relatively large and further the shaped articles are of a large size and therefore even if the starting materials and conditions for the reaction are controlled strictly, it is impossible to prevent the above- Hence, the previous production of cosmetic sponge puff, sponge handkerchief, and filtering media (cylindrical cartridge filter, filtering cloth) and the like composed of polyvinyl acetal porous materials is effected by selecting and using a comparatively good portion in an oversized polyvinyl acetal porous material and cutting and finishing it into a proper shape. But the accurate selection of the good portion is very difficult and the yield of adaptable material of high quality is low. Furthermore, for example, even if the resulting porous material is useful as a filtering medium, it is not suitable for cosmetic sponge puff, sponge handkerchief and the like. Namely, the polyvinyl acetal porous materials obtained by the hitherto known methods, even in the portion having a good quality, are not provided with the excellent properties to make them applicable to various uses.

Thus, according to the hitherto known methods, it was impossible to produce easily and conveniently polyvinyl acetal porous articles which show excellent softness, texture, touch and surface smoothness, low pressure loss in filtration and improved uniformity of micropores, when they absorb water, which properties are desirable in cosmetic sponge puff, sponge handkerchief and filtering media.

The inventors have made many studies to accomplish a commercially useful method for producing polyvinyl acetal porous articles having useful and excellent properties for cosmetic sponge puff, sponge handkerchief, filtering media and as the result such an object has been attained by effecting the acetalization reaction in the presence of 2 to 120% by weight, based on polyvinyl alcohol, of water soluble inorganic salts, when producing a polyvinyl acetal porous article by reacting an aldehyde and an acid catalyst with an aqueous solution of polyvinyl alcohol in the presence of or in the absence of a pore forming agent and the present invention has been accomplished.

According to the present invention, the water soluble inorganic salts present in the reaction system develop a unique colloid chemical function and a catalytic function and owing to this syngeristic function, a continuous net texture composed of polyvinyl acetal, that is, a multi-cellular texture connecting a large number of pores complicatedly, is formed rapidly in the original stage of the reaction and is retained stably in contact with the inner wall of the reaction vessel for a long period of time until the final stage of the reaction. Consequently the polyvinyl acetal porous article does not undergo shrinkage nor deformation and a product having low pressure loss and excellent surface smoothness and softness and high porosity, an elegant touch and uniform micropore structure can be easily obtained. Thus, it is possible to overcome the defects of the known production process, namely, the problems of shrinkage, deformation, ununiformity of micropores, poor surface smoothness and high pressure loss.

Another merit of the present invention is that the polyvinyl acetal porous article is formed in such a state that the porous article is in contact with the whole surface of the inner wall of the reaction vessel and further the contact face is neither tightly adhered nor fixed. Accordingly the porous article can be easily released from the reaction vessel and it is possible to obtain a porous article having no damage on the surface and having a given shape. Accordingly, it is possible to substantially omit cleaning of the reaction vessel after releasing the porous article from the vessel and cutting and finishing of the porous article and the yield of the porous article is very high.

The other merit of the present invention consists in that the resulting polyvinyl acetal porous article has low pressure loss, high porosity and continuous uniform micropores and further is provided with excellent touch and texture when the porous article absorbs water and therefore it can be used effectively for various uses, for example, cosmetic sponge puff, sponge handkerchief, sponge turban, bath mat, cylindrical cartridge filter, filtering cloth, substrate for synthetic leather, sound insulator and the like. For example, the cosmetic sponge puff, sponge handkerchief and the like composed of the porous article absorb water easily and soften and give the same elegant touch and texture as a natural sponge and develop an improved cleaning function against the face. The cosmetic puff adsorbs cosmetic powders, such as solid face powder readily and when such a powder is applied on the face, the puff can give an elegant touch and spread and deposit the powder evenly and uniformly. Accordingly an excellent cosmetic effect can be developed with pleasant feeling. These functions and effects are as excellent as those of natural sponge which is expensive and is hard to obtain and further the commercial mass production of cosmetic sponge puff can be easily effected, so that the product can be obtained inexpensively.

Furthermore, the resulting polyvinyl acetal porous articles are more noticeably excellent in the water absorbing property, softness, touch, cosmetic effect and the like than a cosmetic sponge puff composed of the conventional soft polyurethane foam, soft vinyl chloride foam and the like.

Moreover, the filtering cloth, cylindrical cartridge filter and the like composed of the porous article of the present invention have excellent elasticity and continuous uniform micropores and therefore the pressure loss of the fluid is low and filtration efficiency is high.

The porous article of the present invention is excellent in porosity, vapor permeability, moisture permeability, moisture discharging ability and has continuous uniform micropores, so that it is possible to produce an excellent synthetic leather by using the porous articles as the substrate. Moreover, if the porous article is used as a sound insulator, an excellent sound insulting effect can be developed.

As mentioned above, the present invention can prevent the defects in the previously known methods, that is, the shrinkage, deformation, ununiformity of pores, deterioration of surface smoothness and touch and texture and the like caused in the production, by effecting the acetalization reaction in the presence of comparatively inexpensive water soluble inorganic salts and can provide a novel method, by which the porous article having very excellent properties can be easily and conveniently produced and the industrial value is very high.

The present invention will be explained hereinafter with reference to one embodiment.

The present invention comprises charging a mixture (referred to as "reaction solution" hereinafter) consisting of desired amounts of polyvinyl alcohol, an aldehyde, an acid catalyst, a water soluble inorganic salt and water, with or without adding a pore forming agent, into a reaction vessel of proper shape, acetalizing the polyvinyl alcohol at 40 to 70° C. for 12 to 24 hours, washing the formed polyvinyl acetal porous article with water, removing the remaining aldehyde and acid catalyst and then drying the porous article.

The polyvinyl alcohols to be used in the present invention are obtained by saponifying polyvinyl acetate and the content of the remaining acetyl group is 0 to 10% (mole) and the polymerization degree is preferably 500 to 2,600. These polyvinyl alcohols are used alone or in admixture. The concentration of polyvinyl alcohol in the reaction solution is about 6 to 10% by weight.

As the aldehyde, use may be made of aliphatic or aromatic mono- or dialdehydes and formaldehydes is preferable in view of economy. The amount to be used is 30 to 50% by weight based on polyvinyl alcohol.

The acid catalyst includes acids capable of acting as the catalyst for acetalization reaction of polyvinyl alcohol and among them inorganic acids, such as sulfuric acid, hydrochloric acid, phosphoric acid, hydrobromic acid and the like are particularly preferable. The amount to be used is 20 to 75% by weight based on polyvinyl alcohol.

The term "pore forming agent" used herein means substances which promote and accelerate the formation of micropores when the aqueous solution of polyvinyl alcohol forms the polyvinyl acetal porous article through the acetalization reaction. As the pore forming agent, amylose-containing polysaccharides, such as starch and dextrine and the derivatives thereof, anionic surface active agents having acid resistance and nonionic surface active agents are preferable. Among them, starch and dextrine are most preferable. The amount to be used is not more than 200% by weight, preferably 30 to 150% by weight, based on polyvinyl alcohol.

The water soluble inorganic salts to be used in the present invention involves the inorganic salts which are substantially soluble in water and dissolve uniformly in the reaction system without swelling or dissolving considerably or deteriorating the polyvinyl alcohol or polyvinyl acetal porous article and further without generating gas or noxious compounds. The water soluble inorganic salts to be used in the present invention are, for example, sodium sulfate, sodium chloride, ammonium sulfate, ammonium chloride, potassium sulfate, potassium chloride, aluminum sulfate, sodium iodide, zinc sulfate, sodium phosphate and the like.

The water soluble inorganic salts not suitable for use in the present invention are zinc chloride, sodium thiosulfate, magnesium chloride, stannic chloride, magnesium nitrate, sodium perchlorate, borates, calcium chloride, carbonates, cyanates and the like.

Among the above described water soluble inorganic salts to be used in the present invention, sodium sulfate, potassium sulfate, sodium chloride, ammonium sulfate, aluminum sulfate and zinc sulfate are particularly preferable. The amount to be used varies somewhat depending upon the inorganic salt, but it is preferred to be within the range of 2 to 120% by weight based on polyvinyl alcohol, preferably 10 to 90% by weight. If less than 2% by weight is used, the polyvinyl acetal porous article separates from the mold during the acetalization reaction and shrinks and deforms and the desired excellent porous article can not be obtained, while if more than 120% by weight is used, polyvinyl alcohol is coagulated and precipitated or the surface smoothness, touch and porosity of the formed porous article are considerably deteriorated.

The reaction solution to be used in the present invention is a mixed aqueous solution consisting of the given amounts as described above of polyvinyl alcohol, an aldehyde, the acid catalyst, the water soluble inorganic salt and water or a mixture obtained by adding a pore forming agent and/or a dye stuff, a pigment and the like to the mixed aqueous solution.

The process for preparing the reaction solution is not particularly limited but usually an aqueous solution of polyvinyl alcohol, or an aqueous solution containing a pore forming agent, is added with an aqueous solution of an aldehyde, and a mixed aqueous solution of the acid catalyst and the water soluble inorganic salt and the resulting mixture is stirred.

The thus prepared reaction solution is introduced into a proper shape (cylindrical or, square and the like) of reaction vessel made of rigid plastic, wood, stainless steel and the like and is left to stand at 40–70° C., preferably 45 to 60° C., for 12 to 24 hours to effect the acetalization reaction.

In this case, a continuous net texture composed of a product in which polyvinyl alcohol has been acetalized in a low degree is formed in contact with the whole surface of the inner wall of the reaction vessel relatively rapidly (20 minutes after the reaction starts) in the original stage of reaction owing to the synergistic function of the unique colloid chemical function and the catalytic function of the water soluble inorganic salt present in the reaction system and consequently the partial separation from the mold, shrinkage and deformation of polyvinyl acetal porous article which are observed in the known production processes can be prevented.

Furthermore, hitherto in order to decrease the shrinkage of the reaction product, it has been necessary to carry out the acetalization reaction gradually at a low temperature for a long time, while according to the present invention even if the reaction is carried out at a relatively high temperature and for a short time, the shrinkage and deformation can be completely prevented and the reaction completes relatively rapidly and the production time can be shortened.

The resulting polyvinyl acetal porous article is formed in such a state that the remaining aldehyde, acid catalyst, pore forming agent and the like are contained therein and the porous article is in contact with the whole surface of the inner wall of the reaction vessel. Then the porous article is released from the reaction vessel. The formed porous article is in contact with the whole surface of the inner wall of the reaction vessel stably and does not stick tightly as in the conventional processes. Accordingly the porous article can be easily released from the vessel and the surface smoothness is excellent and the shape is constant. Consequently, on the surface of the inner wall of the vessel after the porous article is released from the vessel, fine pieces of the porous article do not remain, so that the vessel can be reused without cleaning the vessel. Furthermore, the surface of the resulting porous article is smooth. The shape and the volume are substantially the same as those of the reaction vessel, and hence the porous article obtained by directly reacting and molding the reaction solution does not require cutting and polishing and these steps can be omitted. Moreover, when a small size shaped article is obtained from a large size of polyvinyl acetal porous article, the porous article obtained according to the present invention has no shrunken or deformed portion, so that the yield of the satisfactory product is very high and the portion to be polished for changing the shape is minor and the working thereof is easy.

The polyvinyl acetal porous article obtained by washing with water and drying has various excellent properties as mentioned above and wide uses. Furthermore, the porous article having fungi preventing ability, disinfecting ability, sterilizing ability and softness can be obtained by treating the porous article with a fungicide, a disinfecting agent, a sterilizer, a wetting agent and the like.

In order to obtain the reinforced polyvinyl acetal porous article, natural fibers, synthetic fibers, glass fibers, powdery pulp and the like are dispersed in the reaction solution to be used in the present invention and the resulting reaction solution is acetalized in the same manner as described above, whereby the porous article having very excellent mechanical properties in addition to the above described various excellent properties can be obtained.

Moreover, the method of the present invention can be applied to the production of a laminate having the structure that the polyvinyl acetal porous article is adhered and fixed to one or both surfaces of a base cloth such as woven fabric, knitted goods, non-woven fabric and the like.

The following examples are given in illustration of this invention and are not intended as limitations thereof.

EXAMPLE 1

A dispersion of 30 g. of potato starch in 100 cc. of water was added to 650 g. of an aqueous solution containing 70 g. of polyvinyl alcohol having an average polymerization degree of 1,400, and the resulting mixture was heated up to 68° C. while stirring to obtain a pasty aqueous mixed solution. The mixed solution was cooled to 40° C. and there was added 370 g. of an aqueous solution containing 28 g. of formaldehyde, 45 g. of sulfuric acid and a water soluble inorganic salt in the concentration as shown in the following Table 1, and the resulting mixture was mixed homogeneously while stirring to obtain a reaction solution.

Then, 1 kg. of each reaction solution was introduced into a hard plastic cylindrical reaction vessel having an inner diameter of 9 cm. and a length of 25 cm. respectively, and the vessel was dipped in a thermostatically uprightly, and an acetalization reaction was effected at 50° C. for 15 hours. After completion of the acetalization reaction, the resulting porous article was released and taken out from the vessel and washed thoroughly with water to remove remaining sulfuric acid, formaldehyde and starch. The surface of the porous article was observed carefully by the naked eye to examine the surface smoothness and deformation. Five disks having a thickness of 30 mm. were cut from the porous article, and the compression stress and the volume variation were determined with respect to these five disks. Further, a porous article sample having a thickness of 2 mm. was cut, and air was passed through the porous article sample at a rate of 1 m./sec. to determine the pressure loss, which is indicated by "mm. aq." in the following tables. The pressure loss shows the filtering ability and pore structure. The apparent volume V and real volume $V_o$ were measured, and the porosity P was calculated according to the following formula.

$$P \text{ (percent)} = \frac{V - V_o}{V} \times 100$$

As a control, a reaction solution, which was prepared in the same manner as described above except that the inorganic salt or both of the inorganic salt and starch were not added, was reacted in the same manner as described above to prepare a porous article. The resulting porous article also was examined with respect to the above-mentioned properties in the same manner.

The results obtained in the porous article samples of the present invention and in the control samples are shown together in the following Table 1.

In Table 1, the volume variation is calculated according to the following formula:

$$\text{Volume variation } (\%) = \frac{\text{Diameter of porous article} - \text{Inner diameter of reaction vessel}}{\text{Inner diameter of reaction vessel}} \times 100$$

and shows whether the porous article has shrunk or not during the reaction. The compression stress in Table 1 is a value of stress in a porous article when the article was subjected to 50% compression, and shows the softness, touch and texture of the porous containing absorbed water. For example, the compression stress serves for the determination of the quality and adaptability of sponge puff and sponge handkerchief which are used containing absorbed water.

TABLE 1

| Water soluble inorganic salt | | Releasing | Surface smoothness | Volume variation (percent)[2] | Compression stress (kg./10 cm.[2]) | Pressure loss (mm. aq.) | Porosity (percent) |
|---|---|---|---|---|---|---|---|
| Kind | Amount (percent)[1] | | | | | | |
| Sodium sulfate | 1 | Difficult | Bad | −2.8 | 3.1 | 80 | 86.8 |
| Do | 2 | Easy | Good | 0 | 2.0 | 30 | 88.5 |
| Do | 5 | do | Very good | 0 | 1.9 | 31 | 89.9 |
| Do | 10 | Very easy | do | 0 | 1.6 | 28 | 90.7 |
| Do | 20 | do | do | 0 | 1.5 | 20 | 90.9 |
| Do | 30 | do | do | 0 | 1.4 | 21 | 91.0 |
| Do | 40 | do | do | 0 | 1.3 | 20 | 91.1 |
| Do | 50 | do | do | 0 | 1.3 | 21 | 91.3 |
| Do | 65 | do | do | 0 | 1.3 | 20 | 91.4 |
| Do | 75 | do | do | 0 | 1.3 | 21 | 91.0 |
| Do | 85 | do | do | +0.05 | 1.2 | 20 | 90.2 |
| Sodium chloride | 1 | Difficult | Bad | −3.2 | 3.1 | 90 | 86.9 |
| Do | 2 | Easy | Good | −0.1 | 2.1 | 32 | 88.6 |
| Do | 10 | Very easy | Very good | 0 | 1.7 | 28 | 89.8 |
| Do | 20 | do | do | 0 | 1.5 | 20 | 90.6 |
| Do | 35 | do | do | 0 | 1.4 | 20 | 90.0 |
| Do | 50 | do | do | 0 | 1.4 | 20 | 89.1 |
| Do | 65 | do | do | 0 | 1.5 | 20 | 88.9 |
| Do | 85 | do | do | +0.1 | 2.0 | 22 | 88.8 |
| Ammonium sulfate | 1 | Difficult | Bad | −3.3 | 3.2 | 90 | 86.8 |
| Do | 2 | Easy | Good | −0.3 | 2.3 | 30 | 88.6 |
| Do | 10 | Very easy | Very good | 0 | 1.8 | 32 | 89.8 |
| Do | 30 | do | do | 0 | 1.4 | 21 | 90.3 |
| Do | 50 | do | do | 0 | 1.4 | 20 | 90.3 |
| Do | 70 | do | do | 0 | 1.3 | 21 | 90.6 |
| Do | 90 | do | do | 0 | 1.4 | 20 | 91.0 |
| Do | 120 | do | do | +0.2 | 2.1 | 22 | 90.5 |
| No salt (control) | 0 | Difficult | Bad | −3.5 | 4.0 | 118 | 86.1 |
| Neither salt nor starch (control) | 0 | Very difficult | Very bad | −5.5 | 4.1 | 450 | 39.4 |

[1] The amount (percent) of water soluble inorganic salt means weight ration based on the weight of polyvinyl alcohol present in the reaction solution.

[2] The − value of the volume variation means shrinkage (decrease of volume), and the + value means expansion (increase of volume).

As seen from Table 1, when the water soluble inorganic salt is present in the reaction solution in an amount of 2–120% by weight, particularly 10–90% by weight, based on the weight of polyvinyl alcohol, the resulting polyvinyl formal porous article (polyvinyl acetal porous article) has a high elasticity (compression stress), a high porosity, an excellent surface smoothness and a continuous uniform micropore structure. Moreover, the shrinkage and deformation of the resulting porous article are prevented during the acetalization reaction, and the resulting porous article can be very easily released from the reaction vessel. On the contrary, when a porous article is prepared in the conventional method, wherein a reaction solution containing no water soluble inorganic salt or neither water soluble inorganic salt nor starch is used, the resulting porous article separated from the reaction vessel during the acetalization reaction to cause shrinkage and deformation, and further the releasing of the porous article from the mold is relatively difficult. Moreover, the resulting porous article is considerably inferior to that obtained in the present invention in the surface smoothness, softness and pore properties, such as porosity and pressure loss.

Among the porous articles shown in the above Table 1, ones obtained in the present invention, when they have absorbed water, are excellent in the softness, touch and texture, and further low in the pressure loss. Therefore, they can be used advantageously for cosmetic sponge puff and cylindrical cartridge filter. Particularly, when they are used for cosmetic sponge puff, which is used in water absorbed state, cosmetics, such as solid face powder, are adsorbed easily to the puff, and are spread and powdered evenly on the face with an elegant feeling similar to that of natural sponge, and the puff can develop cosmetic effect with a pleasant feeling. While, when the porous article is used for a cylindrical cartridge filter, the pressure loss of the fluid is very small due to the continuous uniform micropore structure, and the filtering efficiency is high.

The cosmetic sponge puff and the cylindrical cartridge filter can be easily manufactured by cutting the cylindrical porous article obtained in the above procedure and finishing into a desired shape.

EXAMPLE 2

Into 780 g. of a pasty aqueous mixed solution containing 50 g. of polyvinyl alcohol having an average polymerization degree of 1,400, 20 g. of polyvinyl alcohol having an average polymerization degree of 500 and 30 g. of potato starch, were added 370 g. of an aqueous solution containing 28 g. of formaldehyde, 45 g. of sulfuric acid and 42 g. of an inorganic salt as shown in the following Table 2. The resulting mixture was stirred and mixed homogeneously to prepare a reaction solution. Then, 1 kg. of each reaction solution was introduced into a cylindrical reaction vessel as described in Example 1 respectively, and an acetalization reaction was effected at 50° C. for 15 hours in a thermostatically controlled tank. After completion of the reaction, the resulting polyvinyl formal porous article was released and taken out from the reaction vessel and washed with water thoroughly. The resulting porous article was determined with respect to various properties in the same manner as described in Example 1.

As a control, acetalization reactions were effected in the same manner as described above, except that a reaction solution containing no inorganic salt or containing neither inorganic salt nor starch was used, to obtain porous articles, and the properties of the porous articles were determined in the same manner as described in Example 1.

Properties of the porous article according to the invention and those of the control porous articles are shown together in the following Table 2.

TABLE 2

| Inorganic salt in the reaction solution | Releasing | Surface smoothness | Volume variation (percent) | Compression stress (kg./10 cm.²) | Pressure loss (mm. aq.) | Porosity (percent) |
|---|---|---|---|---|---|---|
| Sodium sulfate | Very easy | Very good | 0 | 1.3 | 20 | 91.4 |
| Sodium chloride | do | do | 0 | 1.5 | 21 | 90.6 |
| Ammonium sulfate | do | do | 0 | 1.4 | 21 | 91.0 |
| Aluminum sulfate | do | do | 0 | 1.8 | 20 | 89.8 |
| Zinc sulfate | do | do | 0 | 1.7 | 22 | 89.5 |
| Potassium sulfate | do | do | 0 | 1.6 | 20 | 90.5 |
| Ammonium chloride | do | do | 0 | 1.7 | 22 | 89.1 |
| Sodium iodide | do | do | +0.1 | 2.3 | 28 | 88.9 |
| Sodium dihydrogen phosphate | do | do | 0 | 2.0 | 24 | 88.6 |
| Magnesium chloride | Very difficult | Bad | −3.7 | 5.7 | 150 | 61.9 |
| Ammonium carbonate | Difficult | do | −2.5 | 5.0 | 121 | 63.1 |
| Zinc chloride | Very difficult | do | −3.8 | 5.7 | 150 | 62.1 |
| Calcium chloride | do | do | −3.6 | 5.6 | 171 | 62.0 |
| Sodium thiosulfate | do | do | −3.6 | 5.7 | 170 | 61.5 |
| No salt (control) | Difficult | do | −3.5 | 4.1 | 115 | 86.0 |
| Neither salt nor starch (control) | Very difficult | Very bad | −5.9 | 4.1 | 495 | 38.1 |

As seen from Table 2, when the reaction solution (reaction system) contains water soluble inorganic salts, such as sodium sulfate, sodium chloride, ammonium sulfate, aluminum sulfate, zinc sulfate, potassium sulfate, ammonium chloride, sodium iodide and sodium dihydrogen phosphate, the shrinkage and deformation of the porous article which are apt to occur during the reaction can be prevented, and the molded porous article can be easily released from the reaction vessel and has excellent pore properties, surface smoothness and softness. However, when the reaction solution contains water soluble inorganic salts, such as magnesium chloride, zinc chloride, ammonium carbonate, calcium chloride and sodium thiosulfate, the shrinkage and deformation of the resulting porous article occur during the reaction as in the case of conventional method (control samples), and porous articles having a predetermined shape can not be obtained. Moreover, the releasing of the resulting porous article is difficult and the porous aticle is bad in the surface smoothness and pore characteristics. Furthermore, the porous article is high in the compression stress and is rigid, and the touch and texture are inferior to those of porous articles prepared without the addition.

As described above, among various water soluble inorganic salts, only the above-mentioned particularly limited inorganic salts show remarkably excellent effect, and the remarkable difference between the particularly limited inorganic salts and other salts is apparent from Table 2.

The porous article according to the present invention can be very advantageously used for a cosmetic sponge puff and a filtering medium.

EXAMPLE 3

Into 78.8 kg. of a pasty aqueous mixed solution containing 5.0 kg. of polyvinyl alcohol having an average polymerization degree of 1,400, 3.0 kg. of polyvinyl alcohol having an average polymerization degree of 400 and 3.0 kg. of corn starch were added 21.2 kg. of an aqueous solution containing 9.0 kg. of 37% aqueous solution of formaldehyde, 8.0 kg. of 50% sulfuric acid and 4.2 kg. of sodium sulfate, and the resulting mixture was stirred and mixed homogeneously to prepare a reaction solution. Then, 100 kg. of the reaction solution were introduced into 100 cylindrical reaction vessels as used in Example 1 in an amount of 1 kg. in each vessel.

The reaction vessel was placed in a temperature controlled chamber and an acetalization reaction was effected at 50° C. for 18 hours.

The polyvinyl formal porous article was formed in contact with the surface of inner wall of the vessel. The porous article was able to be released very easily from the vessel by hand. The porous article was washed with water thoroughly, and the volume variation was measured in the same manner as described in Example 1 to be found 0%.

All the resulting porous articles, after being washed with water, were soft, and had an elegant touch and texture and an excellent surface smoothness. The compression stress, pressure loss and porosity of the porous article were determined in the same manner as described in Example 1. Average value of the compression stresses was 1.4 kg./10 cm.², that of pressure losses was 20 mm. aq. and that of porosities was 90.9%.

As a control, acetalization reactions were effected in the same manner as described above with the use of the reaction solution prepared in the same manner as described above, except that sodium sulfate was not added. The resulting porous articles were released from 100 reaction vessels. In this case, although the porous article shrank and decreased the volume, the porous article was partially adhered and fixed to the inner wall of the vessel, and therefore it was difficult to release the porous article from the vessel. The porous article was washed with water thoroughly, and the volume variation was determined in the same manner as described in Example 1. The average value of the volume variations was −3.7%. This shows that the porous article has shrunk substantially during the reaction. Moreover, the resulting porous article was inferior in the surface smoothness and touch to the porous article obtained by the above-described method of the present invention. The average values of the compression stresses, pressure losses and porosities of these porous articles were determined in the same manner as described above to obtain 4.2 kg./10 cm.², 110 mm. aq. and 86.0%, respectively.

The cylindrical porous article according to the present invention and that prepared by the conventional method were cut into disk-like porous articles having a thickness of 1.8 cm. respectively, and both the disk-like porous articles were finished under the same condition to prepare cosmetic sponge puffs.

These cosmetic sponge puffs were used as a puff for solid face powder and a test for comparing the properties was made.

This test was made by 100 skilled beauty artists, and among them, 90 artists confirmed that the cosmetic sponge puff according to the present invention is superior in the following points:

(1) The puff becomes soft rapidly in water,
(2) The puff has the same elegant touch as natural sponge,
(3) The face powder can be powdered on the face evenly and uniformly, and
(4) The face powder adhered to the puff can be easily removed.

While, a test for comparing the sponge puff according to the present invention (sample A) and that prepared by the conventional method (sample B) was made by 100 consumers on the property as a puff for solid face powder. The obtained result was as follows:

(1) As to a question, which sample becomes soft more quickly, 85 consumers answered that it was sample A, (2) As to a question, which sample containing absorbed water is excellent in the touch, 95 consumers answered that it was sample A, and (3) As to a question, which sample can apply powder more evenly and uniformly when the face powder is powdered on the face, 85 consumers answered that it was sample A.

As seen from the results of the comparison test by the skilled beauty artists and the consumers, the cosmetic sponge puff according to the present invention is superior to that prepared by the conventional method in the touch, easiness in powdering on face and rate of softening in water. These facts are apparent from the comparison in the pressure loss, porosity and compression stress.

The porous article according to the present invention can be used advantageously for cosmetic sponge puff and and further for filtering media, such as cylindrical cartridge filter and the like.

EXAMPLE 4

A reaction solution was prepared under the same conditions as described in the method of the present invention in Example 2, except that the potato starch was not used, and an acetalization reaction was effected under the same condition as described in Example 2. After completion of the acetalization reaction, the resulting polyvinyl formal porous article was released and then taken out from the reaction vessel and washed with water thoroughly. Then, the porous article was examined with respect to various properties in the same manner as described in Example 1 to obtain results as shown in the following Table 3. As a control, one of control samples shown in Example 2, in which a reaction solution containing neither inorganic salt nor starch was used, was also shown in Table 3.

EXAMPLE 5

A reaction solution of the present invention and that of the control sample, both of which were prepared using the same recipe as described in Example 3, were introduced into square-shaped hard plastic reaction vessel having a length of 70 cm., a width of 60 cm. and a depth of 40 cm. up to a depth of 35 cm., respectively. The reactor was placed in a temperature controlled chamber and an acetalization reaction was effected at 50° C. for 15 hours.

The polyvinyl formal porous article according to the present invention was formed uniformly in contact with the surface of inner wall of the reaction vessel. Then, the porous article was released and taken out from the vessel. In this case, the releasing was very easy.

On the contrary, the porous article prepared from the reaction solution containing no sodium sulfate was partially adhered and fixed to the bottom and other wall surfaces, even though the porous article shrunk upon the completion of the reaction. Therefore, it was difficult to release the porous article from the reaction vessel.

After these porous articles were washed with water thoroughly, the surface was observed by naked eye, and further the volume variation was determined. The porous article of the control sample had an unsmooth surface and relatively rigid touch. The volume variation of this porous article was −3.8%. This shows that the porous article has fairly shrunk during the acetalization reaction. On the contrary, the porous article according to the present invention had a smooth surface and an elegant touch, and had no damage. The volume variation of this porous article was +0.01%. This shows that the volume has increased slightly, but has not substantially varied.

Such very slight increase in the volume (expansion) does not appear at an acetalization reaction in a small

TABLE 3

| Inorganic salt in the reaction solution | Releasing | Surface smoothness | Volume variation (percent) | Compression stress (kg./10 cm.²) | Pressure loss (mm. aq.) | Porosity (percent) |
|---|---|---|---|---|---|---|
| Sodium sulfate | Very easy | Very good | 0 | 1.8 | 20 | 90.8 |
| Sodium chloride | do | do | 0 | 1.9 | 21 | 90.1 |
| Ammonium sulfate | do | do | 0 | 1.9 | 20 | 90.5 |
| Aluminum sulfate | do | do | 0 | 2.0 | 24 | 89.8 |
| Zinc sulfate | do | do | 0 | 2.1 | 21 | 90.1 |
| Potassium sulfate | do | do | 0 | 1.9 | 20 | 90.3 |
| Ammonium chloride | do | do | 0 | 2.1 | 22 | 89.5 |
| Sodium iodide | do | do | +0.1 | 2.5 | 29 | 88.4 |
| Sodium dihydrogen phosphate | do | do | +0.1 | 2.6 | 25 | 89.8 |
| Magnesium chloride | Very difficult | Bad | −4.2 | 6.8 | 150 | 60.5 |
| Ammonium carbonate | Difficult | do | −3.1 | 6.5 | 151 | 60.1 |
| Zinc chloride | Very difficult | do | −4.3 | 6.7 | 192 | 61.2 |
| Calcium chloride | do | do | −4.1 | 6.9 | 185 | 61.0 |
| Sodium thiousulfate | do | do | −4.0 | 7.0 | 180 | 61.2 |
| Neither salt nor starch (control) | do | Very bad | −5.9 | 4.1 | 495 | 38.1 |

As seen from Table 3, when a reaction solution containing sodium sulfate, sodium chloride, ammonium sulfate, aluminum sulfate, zinc sulfate, potassium sulfate, ammonium chloride, sodium iodide or sodium dihydrogen phosphate is used, even if the reaction solution does not contain starch as a pore forming agent, a porous article having a low pressure loss can be obtained. The particular inorganic salts can prevent the shrinkage and deformation of the porous article which are apt to occur during the acetalization reaction. Moreover, the resulting porous article can be released very easily from the mold and is remarkably superior to that prepared from a reaction solution containing the other water soluble inorganic salts in the surface smoothness and in the softness and touch in the water absorbed state.

The porous article according to the invention has good touch, texture and softness, when it has absorbed water, and further has low pressure loss. Consequently, it can be used very advantageously as a cosmetic sponge puff and a filtering medium as the porous article obtained in Example 2.

reaction vessel, but is apt to appear at an acetalization reaction in a large vessel as in the case of the present invention. However, such a phenomenon, i.e., the very slight expansion prevents separation of the resulting porous article from the inner wall of the reaction vessel, shrinkage and deformation, and a porous article having excellent properties can be easily prepared in a commercial scale.

Moreover, even though the very slight increase in the volume occurs, the increase is generally within the allowable range as described above. Therefore, when the porous article was produced directly, the resulting porous article is excellent in the quality and can be used commercially.

The porosities, pressure losses and compression stresses of the above-mentioned both porous articles were determined in the same manner as described in Example 1 to obtain a result as shown in the following Table 4.

TABLE 4

| Sample | Porosity (percent) | Pressure loss (mm. aq.) | Compression stress (kg./10 cm.²) |
|---|---|---|---|
| Present invention | 91.2 | 21 | 1.5 |
| Control | 86.6 | 108 | 4.1 |

As seen from Table 4, the porous article according to the present invention is excellent in the touch, texture and softness when it has absorbed water, and further is excellent in the surface smoothness, pore properties, and low in the pressure loss. Moreover, according to the present invention, the porous article was formed in contact with the inner wall of the reaction vessel without shrinkage as in the case of the above-mentioned examples, and was able to be released very easily from the vessel even in the production of large shaped articles.

The porous article according to the present invention has the above-mentioned excellent properties and can be used as a raw material for the production of cosmetic sponge handkerchief, sponge turban, car cleaning sponge, filtering medium, sound insulator and substrate for synthetic leather. These products can be easily manufactured by cutting and finishing the porous article into a proper shape. Particularly, the cosmetic sponge handkerchief consisting of the porous article is soft and has elegant touch and texture when it has absorbed water, and further has a remarkably excellent cleaning and wiping power. Moreover, since the filtering medium, such as filter cloth, prepared from the porous article has continuous uniform micropores, pressure loss of liquid is small and a high filtration efficiency can be attained.

EXAMPLE 6

A reaction solution was prepared in the same manner as described in Example 2, except that 30 g. of a nonionic surface active agent of a polyoxyethylene glycol ether of lauryl alcohol were used instead of 30 g. of potato starch, and an acetalization reaction was effected in a cylindrical plastic reaction vessel. After completion of the reaction, the resulting polyvinyl formal porous article was taken out from the vessel and washed with water thoroughly. This porous article was determined with respect to various properties in the same manner as described in Example 1 to obtain a result as shown in the following Table 5.

As a control acetalization reactions were effected in the same manner as described above, except that a reaction solution containing no inorganic salt or neither the inorganic salt nor the above-mentioned nonioic surface active agent was used. The properties of the resulting porous article were determined in the same manner, and the obtained result is also shown in the following Table 5.

As seen from Table 5, when the particular inorganic salts to be used in the present invention are present in the reaction solution, the shrinkage and deformation which are apt to occur during the acetalization reaction can be prevented, and the resulting porous article can be released very easily. Moreover, the porous article is remarkably excellent in the surface smoothness, and in the softness and touch when it has absorbed water. Further, the porous article has continuous micropores and is low in the pressure loss. Thus even when a nonionic surface active agent coexists as a pore forming agent, only the above-described particular inorganic salts exhibit the excellent function and effect, and these inorganic salts have remarkably particular properties.

The porous article obtained in this Example 6 can be used advantageously as cosmetic puff, cylindrical cartridge filter and the like similar to that obtained in Examples 1, 2, 3 and 4.

What is claimed is:

1. In a method of producing polyvinyl acetal porous article in which an aqueous solution of polyvinyl alcohol is reacted with an aldehyde and an acid catalyst to effect an acetalization, the improvement which comprises incorporating in the acetalization reaction mixture at the beginning of the acetalization reaction, from 2 to 120% by weight, based on polyvinyl alcohol, of at least one water soluble inorganic salt selected from the group consisting of sodium sulfate, sodium chloride, ammonium sulfate, ammonium chloride, potassium sulfate, potassium chloride, aluminum sulfate, sodium iodide, zinc sulfate and sodium phosphate.

2. The method as claimed in claim 1, wherein the amount of said inorganic salt is 10 to 90% by weight.

3. The method as claimed in claim 1, wherein the acetalization is effected in the presence of at least one of pore forming agents selected from the group consisting of starch, dextrine, nonionic surface active agents and anionic surface active agents.

4. The method as claimed in claim 3, wherein said pore forming agent is added in an amount of not more than 200% by weight based on polyvinyl alcohol.

5. The method as claimed in claim 4, wherein said pore forming agent is added in an amount of 30–150% by weight based on polyvinyl alcohol.

6. The method as calimed in claim 1, wherein said aldehyde is formaldehyde.

7. The method as claimed in claim 1, wherein said aldehyde is added in an amount of 30 to 50% by weight based on polyvinyl alcohol.

TABLE 5

| Inorganic salt in the reaction solution | Releasing | Surface smoothness | Volume variation (percent) | Compression stress (kg./10 cm.$^2$) | Pressure loss (mm. aq.) | Porosity (percent) |
|---|---|---|---|---|---|---|
| Sodium sulfate | Very easy | Very good | 0 | 1.4 | 20 | 91.2 |
| Sodium chloride | do | do | 0 | 1.6 | 20 | 90.5 |
| Ammonium sulfate | do | do | 0 | 1.7 | 21 | 90.8 |
| Aluminum sulfate | do | do | 0 | 1.9 | 21 | 90.4 |
| Zinc sulfate | do | do | 0 | 1.8 | 21 | 90.1 |
| Potassium sulfate | do | do | 0 | 1.8 | 22 | 90.8 |
| Ammonium chloride | do | do | 0 | 1.9 | 23 | 90.1 |
| Sodium iodide | do | do | +0.1 | 2.2 | 26 | 88.8 |
| Sodium dihydrogen phosphate | do | do | +0.1 | 2.1 | 24 | 89.5 |
| Magnesium chloride | Very difficult | Bad | −3.8 | 5.8 | 140 | 62.1 |
| Ammonium carbonate | do | do | −2.9 | 5.1 | 122 | 63.4 |
| Zinc chloride | do | do | −3.8 | 5.7 | 145 | 62.1 |
| Calcium chloride | do | do | −3.7 | 5.7 | 168 | 63.2 |
| Sodium thiosulfate | do | do | −3.8 | 5.8 | 169 | 62.5 |
| No salt (control) | Difficult | do | −3.4 | 4.2 | 115 | 86.1 |
| Neither salt nor nonionic surface active agent (control) | Very difficult | Very bad | −5.9 | 4.2 | 498 | 38.2 |

8. The method as claimed in claim 1, wherein said acid catalyst is at least one inorganic acid selected from the group consisting of sulfuric acid, hydrochloric acid, phosphoric acid and hydrobromic acid.

9. The method as claimed in claim 1, wherein said acid catalyst is added in an amount of 20 to 75% by weight based on polyvinyl alcohol.

10. The method as claimed in claim 1, wherein said polyvinyl alcohol is saponified polyvinyl acetate having from 0 to 10 mole percent of remaining acetyl groups and a polymerization degree of 500 to 2,600.

11. The method as claimed in claim 1, wherein said polyvinyl alcohol is 6 to 10% by weight based on the reaction mixture.

12. The method as claimed in claim 1, wherein said acetalization reaction is effected at 40 to 70° C. for 12 to 24 hours.

References Cited

UNITED STATES PATENTS 3,547,837  12/1970  Ashikaga et al. ____ 260—2.5 F

FOREIGN PATENTS 577,309  6/1959  Canada _____ 260—2.5 F

MURRAY TILLMAN, Primary Examiner

W. J. BRIGGS, SR., Assistant Examiner

U.S. Cl. X.R.

161—159; 260—2.5 L, 2.5 M, 29.6 CM, 29.6 AT, 73 L